US006648007B1

(12) United States Patent
Selby et al.

(10) Patent No.: US 6,648,007 B1
(45) Date of Patent: Nov. 18, 2003

(54) SAFETY HOSE SYSTEM AND A PROCESS FOR MANUFACTURING THEREOF

(75) Inventors: William J. Selby, Stoughton; Ronald A. Selby, Canton, both of MA (US)

(73) Assignee: Samar Company, INC, Stoughton, MA (US)

( * ) Notice: Subject to any disclaimer, the term of this patent is extended or adjusted under 35 U.S.C. 154(b) by 186 days.

(21) Appl. No.: 09/687,566

(22) Filed: Oct. 13, 2000

(51) Int. Cl.[7] ............................ F16L 9/18; F16L 55/16

(52) U.S. Cl. ..................... 137/312; 73/40.5 R; 73/49.1; 138/114; 141/86; 141/88; 222/108; 285/13; 285/123.1

(58) Field of Search .......................... 137/312; 138/114, 138/104, 113, 145; 73/40.5 R, 46, 49.1; 141/86, 88; 222/108; 285/13, 123.1

(56) References Cited

U.S. PATENT DOCUMENTS 3,532,131 A * 10/1970 Lefere ........................ 138/114
5,713,387 A * 2/1998 Armenia et al. ............ 137/312
5,931,184 A * 8/1999 Armenia et al. ............ 137/312
6,039,066 A * 3/2000 Selby ......................... 137/312
6,129,107 A * 10/2000 Jackson ...................... 137/312

* cited by examiner

*Primary Examiner*—George L. Walton
(74) *Attorney, Agent, or Firm*—Steven N. Fox, Esq.

(57) ABSTRACT

A process for manufacturing a safety hose system. In one embodiment, the process of the present invention comprises the steps of positioning the inside hose with the outside hose; inserting first and second pre-mold inserts about the first and second end portions of the inside hose; attaching the first and second connectors to the first and second end portions of the inside hose to form first and second crimped portions, respectively; applying an adhesive to the first and second crimped portions; inserting the first and second crimped portions into the connector inlet portions of the first and second pre-mold inserts, respectively; inserting the drain hose into the drain hose inlet portion of the first pre-mold insert; molding a first end-cap member to the first end portion of the outside hose, the first pre-mold insert, and the drain hose; and molding a second end-cap member to the second end portion of the outside hose and the second pre-mold insert.

11 Claims, 4 Drawing Sheets

SAFETY HOSE SYSTEM AND A PROCESS FOR MANUFACTURING THEREOF

BACKGROUND OF THE INVENTION

U.S. Pat. No. 6,039,066 discloses a safety hose system for use with a washer machine to prevent spillage of water resulting from failure of the primary hot water hose. Safety hose systems of the type exemplified by U.S. Pat. No. 6,039,066 are difficult to manufacture at a low cost and while maintaining optimal performance during operation.

OBJECTS OF THE INVENTION

The primary object of the present invention is to provide a reliable and durable safety hose system that is less costly to produce than convention systems.

SUMMARY OF THE PRESENT INVENTION

The present invention is a safety hose system and a process for manufacturing thereof. In one embodiment, the safety hose system comprises an inside hose having first and second end portions and an outside hose having first and second end portions. The safety hose system further comprises a first connector having a first engagement portion and a first tube portion engaged to the first end portion of the inside hose to form a first crimped portion. The safety hose system further comprises a second connector having a second engagement portion and a second tube portion engaged to the second end portion of the inside hose to form a second crimped portion. The safety hose system further comprises a first pre-mold insert having first and second end portions, a cavity portion, a connector inlet portion in communication with the cavity portion, and a drain hose inlet portion in communication with the cavity portion. The safety hose system further comprises a second pre-mold insert having first and second end portions, a cavity portion, and a connector inlet portion in communication with the cavity portion. The safety hose system further comprises a drain hose engaged with drain hose inlet portion of the first pre-mold insert. The safety hose system further comprises a first end-cap member engaged with the first end portion of the outside hose, the first pre-mold insert, and the drain hose. The safety hose system further comprises a second end-cap member engaged with the second end portion of the outside hose and the second pre-mold insert.

One embodiment of a process for manufacturing the safety hose system of the present invention comprises the steps of positioning the inside hose with the outside hose; inserting first and second pre-mold inserts about the first and second end portions of the inside hose; attaching the first and second connectors to the first and second end portions of the inside hose to form first and second crimped portions, respectively; applying an adhesive to the first and second crimped portions; inserting the first and second crimped portions into the connector inlet portions of the first and second pre-mold inserts, respectively; inserting the drain hose into the drain hose inlet portion of the first pre-mold insert; molding a first end-cap member to the first end portion of the outside hose, the first pre-mold insert, and the drain hose; and molding a second end-cap member to the second end portion of the outside hose and the second pre-mold insert.

BRIEF DESCRIPTION OF THE DRAWINGS

The following detailed description of the invention will be better understood with reference to the accompanying drawings in which.

DETAILED DESCRIPTION OF THE PREFERRED EMBODIMENTS

Figure 1:
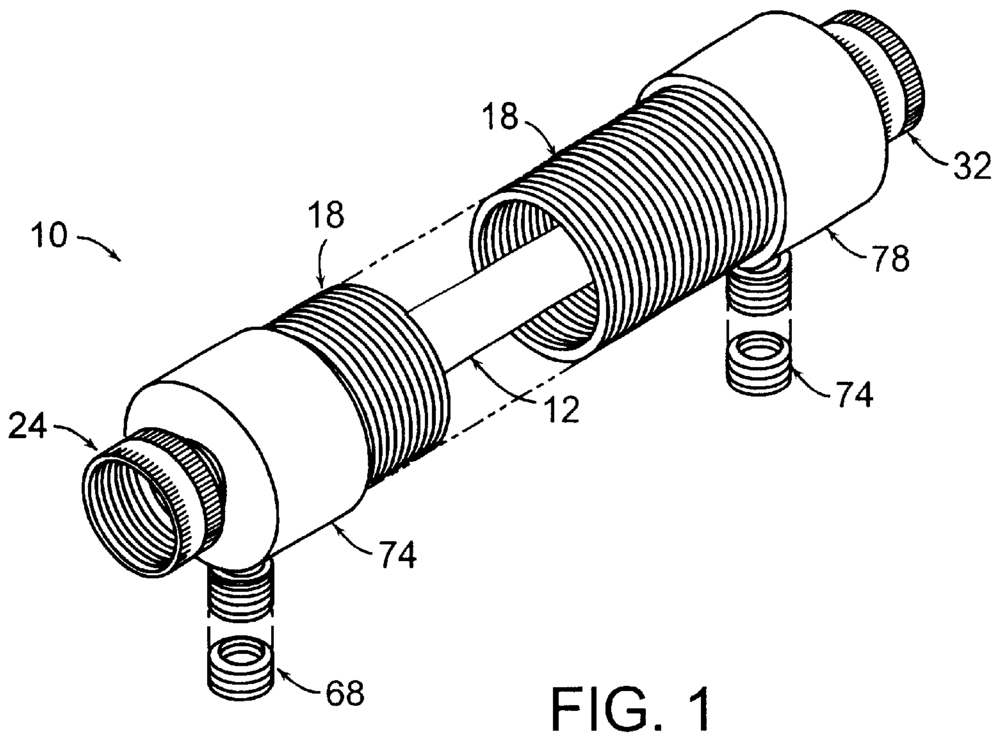
FIG. 1 is a perspective view of a first embodiment of the safety hose system of the present invention.
Figure 2:
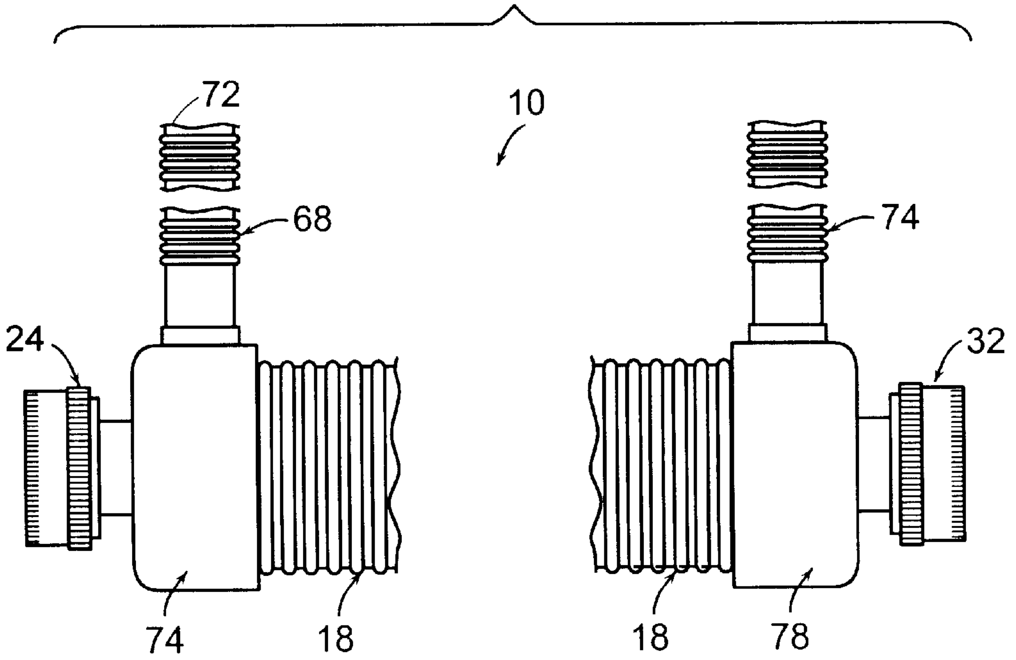
FIG. 2 is an elevation view of the safety hose system of the present invention.
Figure 3:
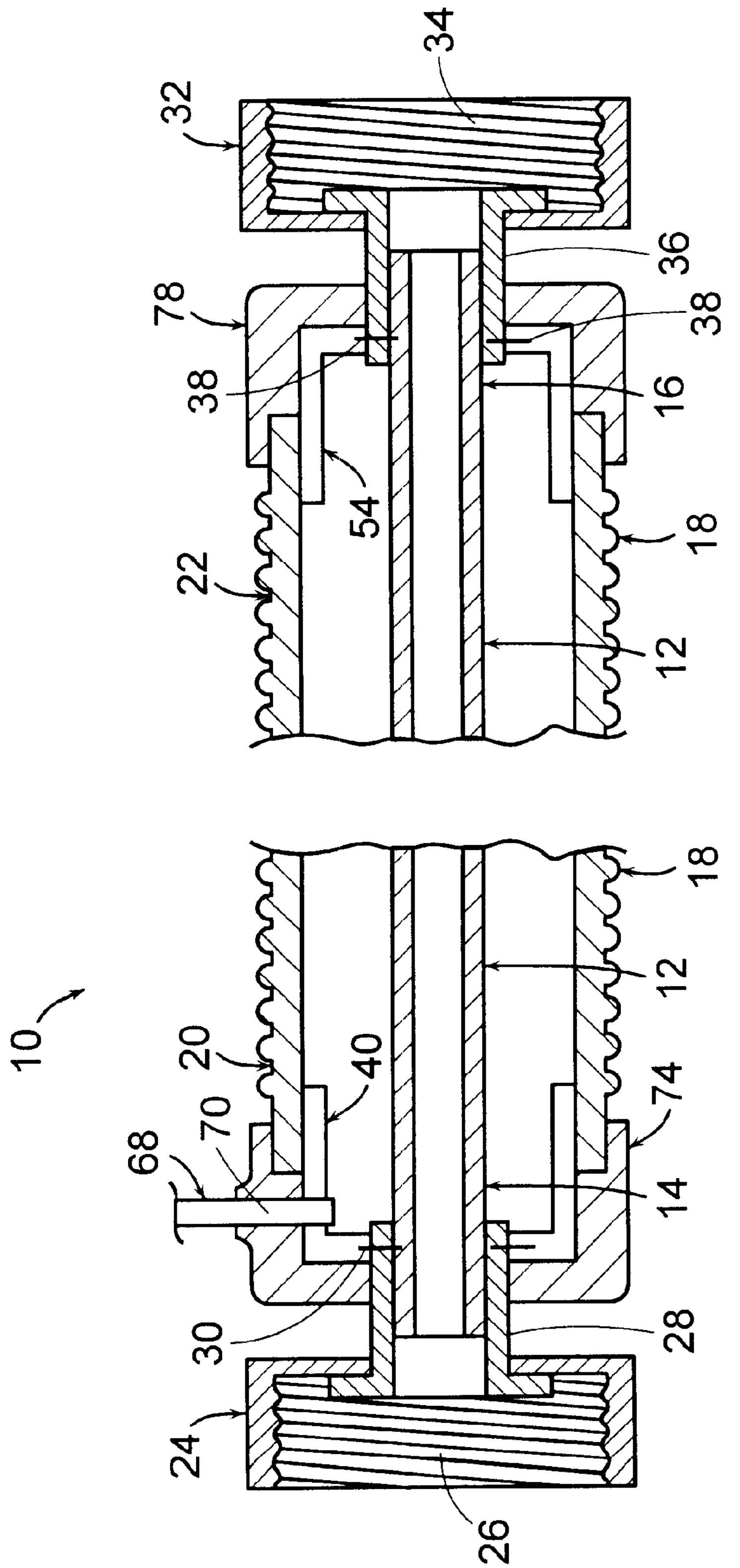
FIG. 3 is a cross-section view of the safety hose system of the present invention.
Figure 4:
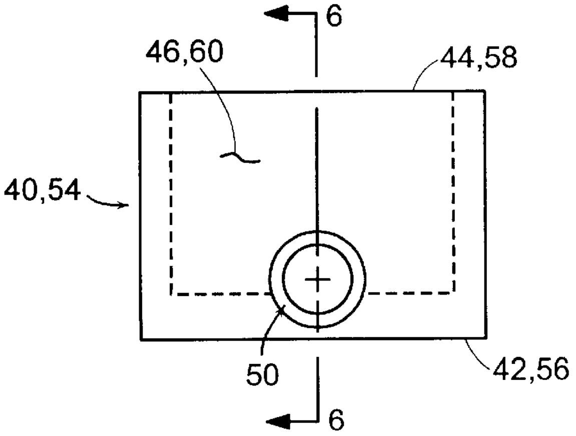
FIG. 4 is a top plan view of the pre-mold insert of the present invention.
Figure 6:
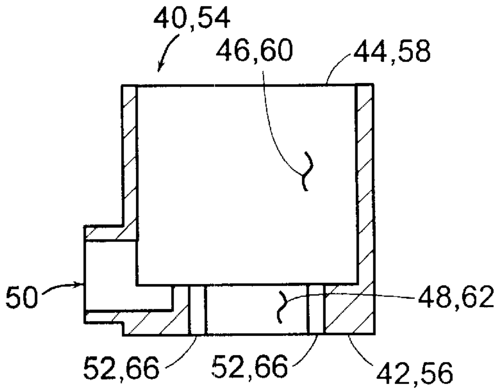
FIG. 6 is a cross-section view of the pre-mold insert of the present invention.
Figure 5:
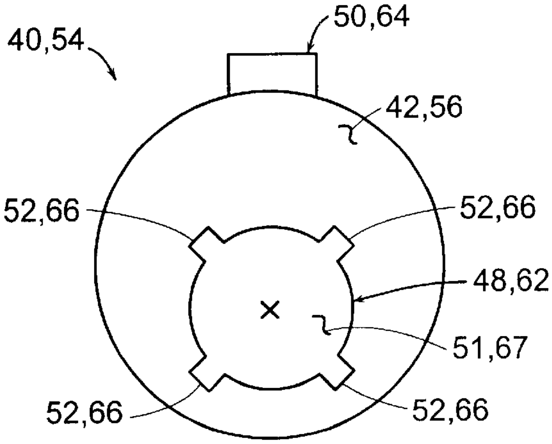
FIG. 5 is a front elevation view of the pre-mold insert of the present invention.

Referring to FIGS. 1–6, wherein a safety hose system 10 is disclosed. The safety hose system 10 generally comprises a comprises an inside hose 12 having first and second end portions 14 and 16. The inside hose 12 is available as Part No. 5-IN38BS, from Swan Corporation of Worthington, Ohio.

The safety hose system 10 further comprises an outside hose 18 having first and second end portions 20 and 22. The outside hose 18 is available as Part No. 5-3001-6B from Global Med Corporation, Aurora, Ohio.

The safety hose system 10 further comprises a first connector 24 having a first engagement portion 26 and a first tube portion 28 engaged by conventional means to the first end portion 14 of the inside hose 12 to form a first crimped portion 30. The safety hose system 10 further comprises a second connector 32 having a second engagement portion 34 and a second tube portion 36 engaged by conventional means to the second end portion 16 of the inside hose 12 to form a second crimped portion 38. The first and second connectors 24 and 32 are each available as Part No. 9-SM8538 from Truex Corporation of Pawtucket, R.I.

The safety hose system 10 further comprises a first pre-mold insert 40 having first and second end portions 42 and 44, a cavity portion 46, a connector inlet portion 48 in communication with the cavity portion 46, and a drain hose inlet portion 50 in communication with the cavity portion 46. The connector inlet portion 48 comprises an opening 51 and a plurality of channels 52 adapted to receive and engage with the first crimped end portion 30 of the first connector 24. The safety hose system 10 further comprises a second pre-mold insert 54 having first and second end portions 56 and 58, a cavity portion 60, and a connector inlet portion 62 in communication with the cavity portion 60. The second pre-mold insert 54 may be provided with a drain hose inlet portion (not shown) in communication with the cavity portion 46 to receive a second drain hose 74 (to be described). The connector inlet portion 62 of the second pre-mold insert 54 comprises an opening 67 and a plurality of channels 66 adapted to receive and engage with the second crimped end portion 38 of the second connector 32. The first and second pre-mold inserts 40 and 54 are made from a thermosetting plastic material and formed by conventional injection molding processes. The thermosetting plastic is available under the brand name Tek Run 4200 by Teknor Apex of Pawtucket, R.I.

The safety hose system 10 further comprises a first drain hose 68 having a first end portion 70 engaged with second opening 50 of the first pre-mold insert 40, and a second end portion 72 adapted to engage with a drain pipe (not shown). The safety hose system may comprise a second drain hose 74 identical to the first drain hose 68 but inserted in a different location such as in the second pre-mold insert 54. The first drain hose 68 is available as Part No. 5-3001-4N from Global Med Corporation of Aurora, Ohio.

The safety hose system 10 further comprises a first end-cap member 76 engaged with the first end portion 20 of the outside hose 18, the first pre-mold insert 40, and the first drain hose 68. The safety hose system 10 further comprises a second end-cap member 78 engaged with the second end portion 22 of the outside hose 18 and the second pre-mold insert 54. The first and second end-cap members 76 and 78 are made from a thermosetting plastic material and formed by conventional injection molding processes. The thermosetting plastic is available under the brand name Tek Run 4200 by Teknor Apex of Pawtucket, R.I.

Figure 7:
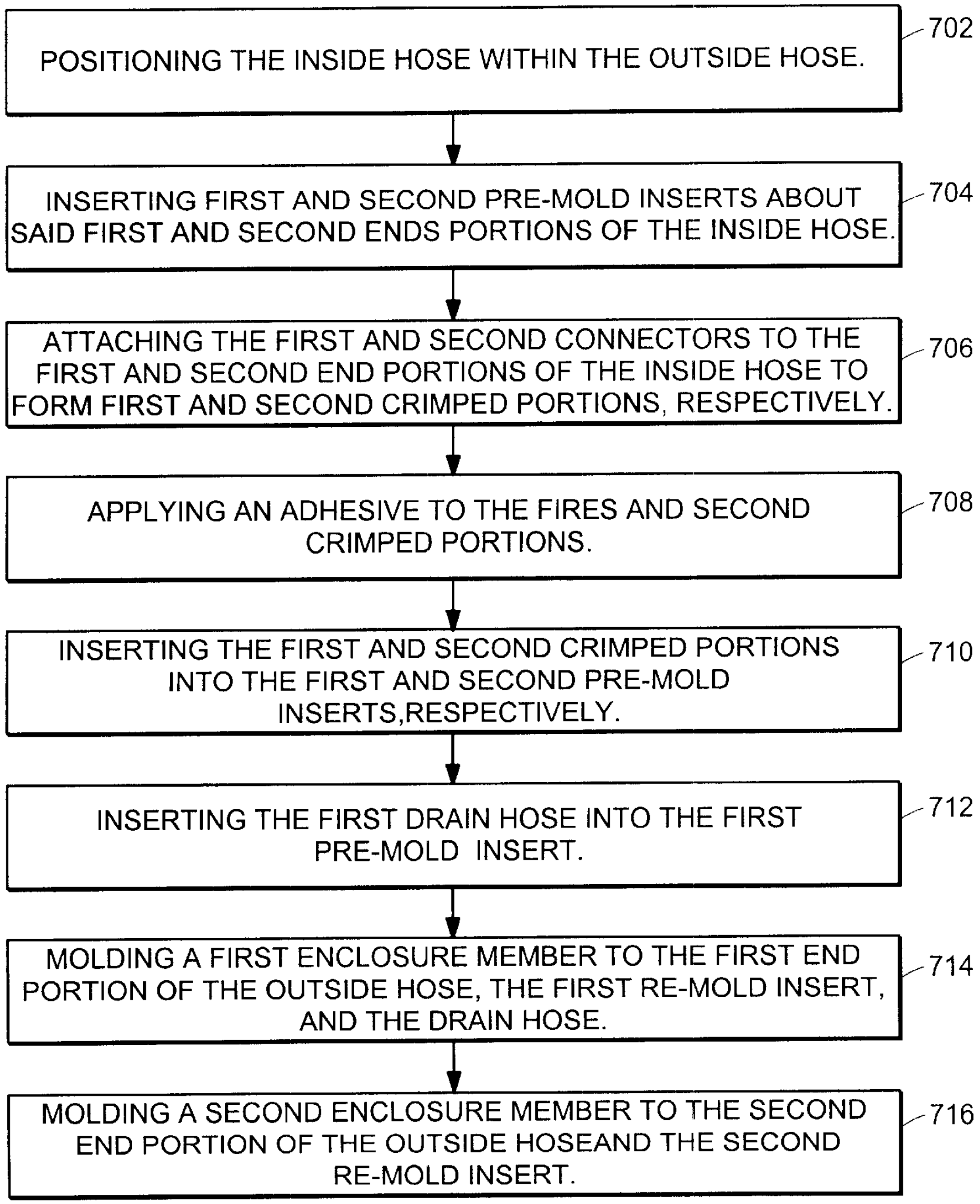
FIG. 7 is a flow chart showing a first embodiment of a process for manufacturing the safety hose system of the present invention.

Referring to FIG. 7, wherein a process for manufacturing the safety hose 10 is shown. As indicated by block 702, the process comprises the initial step of positioning the inside hose with the outside hose. As indicated by block 704, the process further comprises the step of inserting first and second pre-mold inserts about the first and second ends portions of the inside hose. As indicated by block 706, the process further comprises the step of attaching the first and second female connectors to the first and second end portions of the inside hose to form first and second crimped portions, respectively. As indicated by block 708, the process further comprises the step of applying an adhesive to the first and second crimped portions. In one embodiment, the adhesive used is available as Part No. DP-8005 from 3M of Saint Paul, Minn. As indicated by block 710, the process further comprises the step of inserting the first and second crimped portions into the first and second pre-mold inserts, respectively. As indicated by block 712, the process further comprises the step of inserting the drain hose into the first pre-mold insert. As indicated by block 174, the process further comprises the step of molding a first end-cap member to the first end portion of the outside hose, the first pre-mold insert, and the drain hose. As indicated by block 176, the process further comprises the step of molding a second endcap member to the second end portion of the outside hose and the second pre-mold insert.

As described hereto fore, the first and second pre-mold inserts 40 and 54 and the first and second end-cap members 76 and 78 are made from a thermosetting plastic material and formed by conventional injection molding processes and machines. The thermosetting plastic is available under the brand name Tek Run 4200 by Teknor Apex of Pawtucket, R.I. In one process, the first and second pre-mold inserts 40 and 54 and first and second end-cap members 76 and 78 may be molded using a 3.5 ton hydraulic mechanical and vertical molding machine available as Part No. WDHS-35-S1 from Autojector Corporation of P.O. Box 709, Auillay, Ind., 46170, and at a temperature of 420 Fahrenheit at thirty (30) second cycles.

Features List: (To Be Deleted Prior to Issuance of Patent)

10 safety hose system
12 inside hose
14 first end portion
16 second end portion
18 outside hose
20 first end portion
22 second end portion
24 first connector
26 first engagement portion
first tube portion
30 first crimped portion
32 second connector
34 second engagement portion
second tube portion
38 second crimped portion
40 first pre-mold insert
42 first end portion
44 second end portion
46 cavity portion
48 connector inlet portion
50 drain hose inlet portion
51 opening
52 channels
54 second pre-mold insert
56 first end portion
58 second end portion
60 cavity portion
62 connector inlet portion
64 drain hose inlet portion
66 channels
67 opening
68 first drain hose
70 first end portion
72 second end portion
74 second drain hose
76 first end-cap member
78 second end-cap member The foregoing description is intended for purposes of illustration. The invention may be embodied in other forms or carried out in other ways without departing from the spirit or scope of the invention. Modifications and variations still falling within the spirit or the scope of the invention will be readily apparent to those of skill in the art.

What is claimed is:

1. A safety hose system comprising an inside hose having first and second end portions; first and second connector members engaged to said first end and second portions of said inside hose; an outside hose having first and second end portions; first and second pre-mold inserts each having a cavity portion, said cavity portion having substantially open first and second end portions, said first pre-mold insert further comprises a drain outlet opening in communication with said cavity portion; said cavity portion of said first pre-mold insert being spaced and in communication with said cavity portion of said second pre-mold insert; said first and second end portions of said outside hose being engaged with said first and second pre-mold inserts, respectively; said inside hose passing thru said first and second open end portions of said first and second pre-mold inserts; a drain hose member engaged with said drain outlet opening of said first pre-mold insert; a first end-cap member engaged with said first end portion of said outside hose and said first pre-mold insert and said first connector member; and a second end-cap member engaged with said second end portion of said outside hose and said second pre-mold insert and said second connector member.

2. The device of claim 1, wherein said cavity portion of said first and second pre-mold insert are cylindrically shaped.

3. The device of claim 2, wherein said first and second pre-mold inserts are each substantially rigid.

4. The device of claim 3, wherein said first and second pre-mold inserts are each made from a thermosetting material.

5. The device of claim 3, wherein said first and second end-cap members are molded and are substantially rigid.

6. The device of claim 5, wherein said first and second end-cap members are made from a thermosetting material.

7. The device of claim 5, wherein said drain outlet opening of said cavity portion is shaped in the form of a cylindrical channel disposed perpendicular to said first and second open end portions of said cavity portion.

8. The device of claim 7, wherein said first and second connector members each comprise an engagement portion and a tubular portion.

9. The device of claim 8, wherein said first and second end portions of said inside hose are connected to said tubular portion of said first and second connector members, respectively, to form crimped portions.

10. The device of claim 9, wherein said first and second pre-mold inserts each comprise a plurality of recesses formed about the first open end portion of said first and second pre-mold inserts, respectively, adapted to receive said crimped portions of said first and second connector members.

11. The device of claim 10, wherein said first and end-cap member are engaged and molded with said tubular portions of said first and second connector members, respectively.

* * * * *